United States Patent [19]

Boudreaux, Jr.

[11] Patent Number: 4,888,394

[45] Date of Patent: Dec. 19, 1989

[54] PROCESS TO GRAFT STEREOREGULAR POLYMERS OF BRANCHED, HIGHER ALPHA-OLEFINS AND COMPOSITIONS THEREOF

[75] Inventor: Edwin Boudreaux, Jr., Bartlesville, Okla.

[73] Assignee: Phillips Petroleum Company, Bartlesville, Okla.

[21] Appl. No.: 207,364

[22] Filed: Jun. 15, 1988

[51] Int. Cl.$^4$ ............................................. C08F 267/04
[52] U.S. Cl. ..................................... 525/285; 524/336; 524/338; 524/348; 524/349; 524/579; 525/242; 525/244; 525/288; 525/301; 525/304
[58] Field of Search ............... 524/349, 336, 338, 348, 524/579; 525/263, 265, 285, 288, 301, 304

[56] References Cited

U.S. PATENT DOCUMENTS

| | | |
|---|---|---|
| 3,075,948 | 1/1963 | Santelli ............................... 260/45.5 |
| 3,505,279 | 4/1970 | Preston et al. ........................ 260/41 |
| 4,003,874 | 1/1977 | Ide et al. ............................ 260/42.18 |
| 4,225,650 | 8/1980 | van Brederode et al. ........... 428/405 |
| 4,247,667 | 1/1981 | Noriji et al. .......................... 525/254 |
| 4,481,322 | 11/1984 | Godlewski et al. ................. 524/265 |
| 4,501,827 | 2/1985 | Nagano et al. ...................... 523/214 |
| 4,550,130 | 10/1985 | Kishida et al. ...................... 523/436 |
| 4,558,094 | 12/1985 | Deguchi et al. ....................... 525/71 |
| 4,639,398 | 1/1987 | Bergstrom ........................... 428/451 |
| 4,639,495 | 1/1987 | Waggoner ........................... 525/285 |
| 4,663,369 | 5/1987 | Kawi et al. .......................... 523/203 |

OTHER PUBLICATIONS

Chemical Engineering, J. Albert Rolston (1/28/80), pp. 101–106.

Modern Plastics Encyclopedia, J. D. Capolupo & T. M. Chucta, 1986–1987, pp. 112 & 114.

Organofunctional Silanes–A Profile, Union Carbide Sales Literature (5/83).

Injection Molding Newsletter, Issue 16, D. V. Rosato, (1987), p. 7.

Primary Examiner—Theodore E. Pertilla
Attorney, Agent, or Firm—Lynda S. Jolly

[57] ABSTRACT

Stabilized, stereoregular polymers of branched, higher alpha-olefins can be modified with unsaturated silanes, carboxylic acids, and/or carboxylic acid anhydrides in the presence of a free radical generator in the polymer melt. These polymers can also contain additional additives, such as glass fibers.

35 Claims, No Drawings

PROCESS TO GRAFT STEREOREGULAR POLYMERS OF BRANCHED, HIGHER ALPHA-OLEFINS AND COMPOSITIONS THEREOF

BACKGROUND OF THE INVENTION

Polyolefins, as a class of materials, tend to have excellent physical and chemical properties and are useful materials for fibers, films, and other molding resins. Improvement of polymer properties is a dominant factor in the development and production of olefin polymers. Several methods have been employed to improve various polymer properties. Prior art teaches that reinforcing agents, such as glass, can be incorporated into the polymer to improve mechanical properties or to improve heat resistance. However, satisfactory improvements in the mechanical properties and/or heat resistance cannot be obtained by simply mixing glass fibers in a polyolefin because the bonding strength between the glass fibers and polyolefin is weak. Thus, such polymers must have a more "bondable" component grafted thereon to facilitate reinforcement with glass fibers and other generally infusible reinforcing agents.

Polymers with relatively high melting points, such as, for example, stereoregular polymers of branched, higher alpha-olefins, have been developed. These polymers are useful in high temperature applications, such as, for example, microwave packaging. Improving the thermal performance and/or properties of these polymers could expand the uses of these polymers, for example, as electrical and/or electronic connectors, automobile parts, and electric appliances. Because of the relatively high melting points and even higher melt processing temperatures, these polymers are thermally unstable and can be very susceptible to thermal degradation. Therefore, it is difficult to graft, and optionally reinforce, stereoregular polymers of branched, higher alpha-olefins in a melt process, such as can be done with other polyolefins such as polyethylene or polypropylene.

Grafting, or chemically modifying, polyolefins, especially relatively low melting point polymers, such as polyethylene and polypropylene, can be done alone or in combination with the addition of a reinforcing agent. Prior art teaches many grafting compounds, as well as several grafting processes. Grafting usually is done in the presence of a free radical generator and usually by a solution or melt process. Unfortunately, the presence of a free radical generator is also known to cause degradation of the polymer. Furthermore, a melt grafting process is also known to be detrimental to the properties of stereoregular polymers of branched, higher alpha-olefins. Prior art teaches that stereoregular polymers of branched, higher alpha-olefins, preferably, are grafted by a solution process.

Polyolefins are vulnerable to thermal-oxidative degradation due to exposure to heat or oxygen during processing and/or storage. To preserve desirable polymer properties, an antioxidant or stabilizer is sometimes used to inhibit discoloration and/or molecular deterioration. An unstabilized polyolefin can be susceptible to rapid deterioration over time. Unfortunately, the use of a stabilizer can have a detrimental effect on the grafting process. Stabilizers function as radical scavengers and peroxide decomposers. Stabilizers can hinder, if not halt, the grafting reaction.

SUMMARY OF THE INVENTION

It is an object of this invention to provide an improved olefin polymer.

It is another object of this invention to provide an olefin polymer with improved thermal properties.

It is yet another object of this invention to provide a stereoregular polymer of branched, higher alpha-olefins with improved thermal properties.

It is yet another object of this invention to provide a stereoregular polymer of branched, higher alpha-olefins with improved thermal properties.

It is yet another object of this invention to provide a stereoregular polymer of branched, higher alpha-olefins with improved hydrolytic stability.

It is still another object of this invention to provide an improved, simplified process to graft a stereoregular polymer of branched, higher alpha-olefins.

It is yet another object of this invention to provide an improved process to graft a stabilized stereoregular polymer of branched, higher alpha-olefins.

It is still another object of this invention to provide an improved process to reinforce with glass fibers a grafted, stabilized, stereoregular polymer of branched, higher alpha-olefins.

In accordance with this invention, a stabilized, stereoregular polymer of branched, higher alpha-olefins is contacted in a melt with a grafting ocmpound selected from the group consisting of vinylpolymerizable, unsaturated, hydrolyzable silanes; carboxylic acids; carboxylic acid derivatives; carboxylic acid anhydrides; carboxylic acid anhydride derivatives; and mixtures thereof, in the presence of a free radical generator.

In accordance with another embodiment, of this invention, a process is provided to reinforce with glass fibers a grafted, stabilized, stereoregular polymer of branched, higher alpha-olefins.

In accordance with yet another embodiment of this invention, a stabilized, stereoregular polymer of branched, higher alpha-olefins with improved thermal and hydrolytic stability properties is provided.

DESCRIPTION OF THE PREFERRED EMBODIMENTS

Polymers

This invention is particularly applicable to olefinic polymers which have a melting point higher than about 180° C., more preferably, a melting point of greater than about 190° C. Polymers produced from linear monomers, such as ethylene, propylene, butene, and hexene, usually have a lower melting point than polmers of branched, higher alpha-olefins. Thus, the polymers useful in this invention are homopolymers and copolymers of branched, higher alpha-olefins. The preferred alpha-olefin monomers have from about 4 to 12 carbon atoms. Exemplary monomers include, but are not limited to, 3-methyl-1-butene (3MB1), 3-methyl-1-pentene (3MP1), 4-methyl-1-pentene (4MP1), 4-methyl-1-hexene (4MH1), 3,3-dimethyl-1-butene (3,3DMB1), 4,4-dimethyl-1-hexene (4,4DMH1), and other similar monomers. Most preferably, polymers of 4MP1, also called polymethylpentene (PMP) and 3MB1, also called polymethylbutene (PMB). Table I gives the approximate melting point of each homopolymer listed above.

TABLE I

| Polymerized Monomer | Approx. Melting Temp., °C. |
| --- | --- |
| 3MB1 | 300 |
| 3MP1 | 370 |
| 4MP1 | 240 |
| 4MH1 | 196 |
| 3,3DMB1 | 400 |
| 4,4,DMH1 | 350 |

The term "polymer", as used in this disclosure, includes homopolymers, as well as copolymers. Copolymers comprise the product resulting from combining a branched, higher alpha-olefin with any other olefin monomer or monomers. For example, a branched, higher alpha-olefin can be polymerized in the presence of, or in series with, one or more olefin monomers. Generall,y, applicable comonomers have from about 2 to about 18 carbon atoms and preferably, have from about 8 to about 16 carbon atoms. Most preferably, the comonomer or comonomers are alpha-olefins. Longer chain linear olefins are preferred in that they are easier to copolymerize with higher, branched alpha-olefins and can impart increased clarity, stability, and impact strength to the resultant polymer. Exemplary comonomers include, but are not limited to, 1-octene, 1-decene, 1-dodecene, 1-tetradecene, 1-hexadecene, and other higher olefins. A polymer can also be obtained by physically blending homopolymers and/or copolymers.

In general, it is preferred for the polymer to comprise at least about 85 mole percent moieties derived from higher, branched alpha-olefins, and more preferably, at least about 90 mole percent. Most preferably, the polymer comprises at least about 95 mole percent moities derived from higher, branched alpha-olefins, which results in a polymer of superior strength and a high melting point.

After the polymer has been produced, it is essential, according to this invention, that the polymer be given a prophylatic charge with a hindered phenol before additional processing of the polymer. The hindered phenol acts as an antioxidant and improves the heat, light, and/or oxidation stability of the polymer. As a result of the prophylactic charge, the polymer product can withstand drying and storage after the polymerization process. Any hindered phenol in an amount which improves the heat, light, and/or oxidation stability of the polymer is applicable. Exemplary hindered phenol compounds include, but are not limited to, 2,6-di-tert-butyl-4-methylphenol; tetrakis(methylene (3,5-di-tert-butyl-4-hydroxyphenyl)propionate) methane; thiodiethylene bis(3-(3,5-di-tert-butyl-4-hydroxyphenyl)propionate); octadecyl 3-(3,5-di-tert-butyl-4-hydroxyphenyl)propionate; tris(3,5-di-tert-butyl-4-hydroxybenzyl)isocyanurate; 1,3,5-trimethyl-2,4,6-tris(e,t-di-tert-butyl-4-hydroxybenzyl)benzene; and/or 2,2'-methylene bis(4-methyl-6-tert-butylphenol). Preferably the hindered phenol antioxidant used for the prophylactic charge is selected from the group consisting of 2,6-di-tert-butyl-4-methylphenol; tetrakis(methylene (3,5-di-tert-butyl-4-hydroxyphenyl)propionate)methane; octadecyl 3-(3,5-di-tert-butyl-4-hydroxyphenyl)propionate; and mixtures thereof because of ease of sue, availability, and economic reasons.

In addition to the essential prophylactic charge of hindered phenol, other antioxidants or stabilizers can be added to further stabilize the polymer. The type(s) of stabilizer(s) used depends on the final application or use of the polymer. Numerous polymer additives are commercially available and are usually selected from the group consisting of hindered phenols, organic phosphites, hindered amine light stabilizers, and mixtures thereof.

The organic phosphites useful in this invention can be any aliphatic, aromatic, or aliphatic-aromatic phosphite and thiophosphite. Exemplary diphosphite compounds include, but are not limited to, bis(2,4-ditert-butyl)pentaerythritol diphosphite, tetrakis-(2,4-di-tert-butylphenyl)-4,4'-biphenylene diphosphonite; distearyl pentaerythritol diphosphite; trisnonylphenyl phosphite; tris(2,4-di-tert-butylphenyl) phosphite; diisodecyl petaerythritol diphosphite; tetraphenyl dipropyleneglycol diphosphite; and mixtures thereof. Preferably, the organic phosphites useful in this invention are selected from the group consisting of bis(2,4-di-tert-butyl)pentaerythritol diphosphite; tetrakis-(2,4-di-tert-butylphenyl)-4,4'-biphenylene diphosphonite; distearyl pentaerythritol diphosphite; diisodecyl pentaerythritol diphosphite; and mixtures thereof. Preferably, substituted pentaerythritol diphosphites are used because they are less volatile and more stable at the high temperaures required to process stereoregular polymers of branched, higher alpha-olefins.

Hindered amine light stabilizers, such as, for example, polymeric hindered amines like piperidenyl triazine polymers and piperidenyl triazine derivative polymers, are also useful in this invention. These types of piperidenyl triazine polymers are disclosed in U.S. 4,086,204, herein incorporated by reference. Examples of hindered amine light stabilizers include, but are not limited to, poly[[6-[(1,1,3,3-tetramethylbutyl)amino]-5-triazine-2,4-diyl]-[(2,2,6-tetramethyl-4-piperidyl)imino], 2-(3',5'-di-tert-butyl-2'-hydroxyphenyl)-5-chlorobenzotriazole; bis(2,2,6,6-tetramethyl-4-piperridinyl)sebacate; bis(1,2,2,6,6-pentamethyl-4-piperridinyl)sebacate; n-butyl-3(3,5-di-tert-butyl-4-hydroxybenzyl)bis-(1,2,2,6,6-pentamethyl-4-piperridinyl)malonate; and/or dimethyl succinate polymer with 4-hydroxy-2,2,6,6-tetramethyl-1-piperidine ethanol. Preferably, the hindered amine light stabilizers useful in this invention are selected from the group consisting of dimethyl succinate polymer with 4-hydroxy-2,2,6,6-tetramethyl-1-piperidine ethanol; poly[[6-[(1,1,3,3-tetramethylbutyl)amino]-5-triazine-2,4-diyl]-[(2,2,6,6-tetramethyl-4-piperidyl)imino]-hexamethylene-[2,2,6,6-t 4-piperidyl)imino]; and mixtures thereof because they are polymeric, and therefore less volatile at high temperatures.

The total. polymer stabilizer package that can be added prior to grafting, which comprises the essential hindered phenol antioxidant prophylactic charge, and the optional additional hindered phenol, organic phosphite, and/or hindered amine light stabilizer, is usually added to the polymer in the range of about 0.05 to about 2 parts by weight of total stabilizer(s) per 100 parts by weight of polymer (phr). Preferably, the hindered phenol prophylactic charge comprises an amount in the range of about 0.1 to about 1 phr, and most preferably in an amount in the range of about 0.1 to about 0.8 phr. If insufficient hindered phenol is present, oxidative degradation of the polymer can occur. The presence of excess hindered phenol can interfere with the grafting process. If desired, additional stabilizers, i.e., in excess of 2 phr, can be added any time after the grafting process, depending on the desired polymer properites.

Other additives can optionally be incorporated into the polymer, before and after grafting, to achieve additionally desired beneficial polymer properties. General exemplary additives include, but are not limited to, antioxidants, antioxidant synergists, UV absorbers, nickel stabilizers, pigments, charges, plastifying agents, optical brighteners, antistatic agents, flame retardants, lubricating agnets, more anticorrosive agents, metal inhibitors, and the like. Processing lubricants can also be added to enhance polymer properties. Examples of processing lubricants include, but are not limited to, fatty acids containing about 10 to about 20 carbon atoms and the metal salts thereof. Usually, metal stearates, such as, for example, calcium stearate and zinc stearate, and/or metal laurates are used as processing lubricants and/or acid scavengers for polyolefins. If corrosion is a potential problem, one or more corrosion inhibitors can be added.

Any additive can be combined with the polymer according to any method known in the art. Examples of incorporaton methods include, but are not limited to, dry mixing, in the form of a powder, and wet mixing in the form of a solution or slurry. In these types of methods, the polymer can be in any form, such as, for example, fluff, powder, granulate, pellet, solution, slurry, and/or emulsion. For ease of operation, the initial prophylactic charge of hindered phenol is usually solution or slurry mixed with the polymer prior to drying and handling of the polymer. Any additional stabilizers or additives can be blended with the polymer prior to grafting, added to the polymer melt during the grafting, or optional glass reinforcing, process, and/or added during reprocessing of the grafted, and optionally glass reinforced, polymer.

Grafting

The stabilized, stereoregular polymers of branched, higher alpha-olefins are modified by grafting with a radically polymerizable unsaturated grafting compound selected from the group consisting of vinyl-polymerizable, unsaturated, hydrolyzable silane compounds, carboxylic acids and derivatives, carboxylic acid anhydrides and derivatives, and mixtures thereof, in the presence of a free radical generator.

The vinyl-polymerizable unsaturated, hydrolyzable silanes used in this invention contain at least one silicon-bonded hydrolyzable group, such as, for example, alkoxy, halogen, and acryloxy, and at least one silicon-bonded vinyl-polymerizable unsaturated group such as, for example, vinyl, gamma-methacryloxypropyl, alkenyl gamma-acryloxpropyl, 6-acryloxyhexyltriethoxysilane, alkyloxypropyl, ethynyl, and 2-propynyl and preferably is an ethylenically unsaturated group. Any remaining valances of silicon not satisfied by a hydrolyzable group or a vinyl-polymerizable unsaturated group being satisfied by a monovalent hydrocarbon group, such as, for example, methyl, ethyl, propyl, isopropyl, butyl, pentyl, isobutyl, isopentyl, octyl, decyl, cyclohexyl, cyclopentyl, benzyl, phenyl, phenylethyl, and naphthyl. Suitable silanes of this type include those represented by the formula:

$$R_aSiX_bY_c$$

wherein R is a monovalent hydrocarbon group, X is a silicon-bonded hydrolyzable group, Y is a silicon-bonded monovalent organic group containing at least one vinylpolymerizable unsaturated bond, a is an integer of 0 to 2, preferably 0; b is an integer of 1 to 3, preferably 3; c is an integer of 1 to 3, preferably 1; and $a+b+c$ is equal to 4.

Suitable vinyl polymerizable unsaturated hydrolyzable silanes that can be used in this invention include, but are not limited to, 3-acryloxypropyltriethoxysilane, ethynyltriethoxysilane, 2-propynyltrichlorosilane, 3-acryloxypropyldimethylchlorosilane, 3-acryloxypropyldimethylmethoxysilane, 3-acryloxypropylmethyldichlorosilane, 3-acryloxypropyltrichlorosilane, 3-acryloxypropyltrimethoxysilane, allyldimethylchlorosilane, allylmethyldichlorosilane, allyltrichlorosilane, allyltriethoxysilane, allyltrimethoxysilane, chloromethyldimethylvinylsilane, [2-(3-cyclohexenyl)ehtyl]dimethylchlorosilane, 2-(3-cyclohexenyl)ethyltrimethoxysilane, 3-cyclohexenyltrichlorosilane, diphenylvinylchlorosilane, diphenylvinylethoxysilane, (5-hexenyl)dimethylchlorosilane, (5-hexenyl)dimethylchlorosilane, 5-hexenyltrichlorosilane, methacryloxypropyldimethylchlorosilane, 3-methacryloxypropyldimethylethoxysilane, 3-methacryloxypropylmethyldiethoxysilane, 3-methacryloxypropyltrichlorosilane, methyl-2-(3-cyclohexenyl)-ethyldichlorosilane, methyl-3-(trimethylsiloxy)crotonate, 7-octenyltrichlorosilane, 7-octenyltrimethoxysilane, 1-phenyl-1-trimethylsiloxyethylene, phenylvinyldichlorosilane, styrylethyltrimethoxysilane, 13-tetradecenyltrichlorosilane, 4-[2-(trichlorosilyl)ethyl]cyclohexene, 2-(trimethylsiloxy)ethylmethacrylate, 3-(trimethylsilyl)cyclopentene, vinyldimethylchlorosilane, vinyldimethylethoxysilane, vinylethyldichlorosilane, vinylmethyldiacetoxysilane, vinylmethyldichlorosilane, vinylmethyldiethoxysilane, vinyltrimethylsilane, vinyltrichlorosilane, vinyltriethoxysilane, vinyltrimethoxysilane, vinyltris(beta-methoxyethoxy)silane, vinyltriacetoxysilane, 3-methacryloxypropyltrimethoxysilane, and 3-methacryloxypropyltris(beta-methoxyethoxy)silane.

The preferred silane compounds are vinyltrichlorosilane, vinyltriethoxysilane, vinyltrimethoxysilane, vinyltris(beta-methoxyethoxy)silane, vinyltriacetoxysilane, 3-methacryloxypropyl trimethoxysilane, 3-methacryloxypropyltris(beta-methoxyethoxy)silane, and mixtures thereof. These compounds are preferred due to commercial availability, ease of use, as well as good polymer property improvement.

The radically polymerizable unsaturated grafting compound also can be a carboxylic acid or an anhydride thereof, with about three to about 10 carbon atoms, with preferably at least one olefinic unsaturation, and derivatives thereof. Examples of the carboxylic acid and anhydride include, but are not limited to, an unsaturated monocarboxylic acid such as acrylic acid or methacrylic acid; an unsaturated dicarboxylic acid such as maleic acid, fumaric acid, itaconic acid, citraconic acid, allyl succinic acid, mesaconic acid, glutaconic acid, Nadic acid (Trademark: norbornene-2,3-dicarboxylic acid), methyl Nadic acid, tetrahydrophthalic acid, or methylhexahydrophthalic acid; an unsaturated dicarboxylic anhydride such as maleic anhydride, itaconic anhydride, citraconic anhydride, allyl succinic anhydride, glutaconic anhydride, Nadic anhydride (Trademark: norbornene-2,3-dicarboxylic anhydride), methyl Nadic anhydride, tetrahydrophthalic anhydride, or methyltetrahydrophthalic anhydride; or a mixture of 2 or more thereof. Of these unsaturated carboyxlic acids and acid anhydrides thereof, maleic acid, maleic anhydride, Nadic acid, methyl Nadic acid, methyl Nadic anhydride, or Nadic anhydride is preferably used.

The radically polymerizable unsaturated grafting compound is present in the reaction mixture in an amount sufficient to improve the properties of the resultant grafted polymer. Usually, the amount is in the range of about 0.2 to about 2 parts of radically polymerizable unsaturated grafting compound per 100 parts of polymer (phr), preferably in the range of about 0.4 to about 1.5 phr, and most preferably in the range of about 0.8 to about 1.2 phr. If too much grafting compound, not all of the grafting compound will be grafted onto the polymer and no additional appreciable polymer property improvement is obtained; an excess is economically undesirable. Too little grafting compound does not improve or enhance the polymer properties. In general, the grafting compounds used in this invention have similar amounts of functionality.

The grafting reaction must occur in the presence of a free radical generator, also called a free radical initiator. An organic peroxide is preferably used as the free-radical initiator in the graft modification reaction as described above. More specifically, preferred examples of an organic peroxide include, but are not limited to an alkyl peroxide, an aryl peroxide, an acyl peroxide, an aroyl peroxide, a ketone peroxide, a peroxycarbonate, a peroxycarboxylate, a hydroperoxide, and other organic peroxides. Examples of an alkyl peroxide inlcude diisopropyl peroxide; di-tert-butyl peroxide; 2,5-dimethyl-2,5-(di-tert-butylperoxy)hexyne-3; a,a'-bis(tert-butylperoxy)diisopropyl benzene; and 2,5-dimethyl-2,5-(di-tert-butylperoxy)hexane. An example of an aryl peroxide is dicumyl peroxide. An example of an acyl peroxide is dilauroyl peroxide. An example of an aroyl peroxide is dibenzoyl peroxide. Examples of a ketone peroxide include methyl ethyl ketone peroxide and cyclohexanone peroxide. Examples of hydroperoxide include tert-butyl hydroperoxide and cumene hydroperoxide. Preferred examples of a free-radical initiator are di-tert-butyl peroxide; 2,5-dimethyl-2,5-(di-tert-butylperoxy)-hexyne-3; 2,5-dimethyl-2,5-(di-tert-butyl-peroxy)hexane, dicumyl peroxide; dibenzoyl peroxide; a,a'-bis)tert-butylperoxy)diisopropylbenzene; and mixtures thereof. Higher molecular weight organic peroxide compounds are preferred because they are safer and easier to handle and store, as well as being more stable at higher temperatures.

The organic peroxide is present in the grafting reaction in an amount sufficient to effectuate a grafting reaction. Usually, the amount is in the range of about 0.001 to about 5 parts or organic peroxide per 100 parts polymer (phr), preferably in the range of aobut 0.001 to about 1 phr, and most preferably in the range of about 0.005 to about 0.04 phr. Too much organic peroxide can still initiate the grafting reaction, but polymer degradation, such as vis-breaking of the polymer, can occur. Too low of a concentraton of organic peroxide does not initiate the grafting reaction.

The grafting reaction must occur in the polymer melt. Thus, the temperature of the reaction is in the range from about the polymer melting point to about the polymer decomposition temperature. Preferably, the reaction temperature is in the range from about 20° C. above the polymer melting point to about the decomposition temperature of the polymer. Most preferably, the lower end of the temperature range is utilized to minimize any thermal degradation effects to the polymer.

The time required for the grafting reaction is a length sufficient for the grafting to occur. Usually, the time is in the range of about 10 seconds to about 30 hours, preferably in the range of from about 15 seconds to about 3 hours. Most preferably, the reaction time is in the range of from about 30 seconds to about 10 minutes. Shorter times, such as less than 5 minutes, are preferred to minimize thermal degradation effects to the polymer.

The grafting reaction can be carried out by both batch and continuous processes, as long as all components are well dispersed and well blended. A continuous process is preferred for ease of operation. One example of a continuous process is to add the polymer(s), stabilizer(s), grafting compound(s), and free radical generator(s) to an extruder. The order of addition of the components is not critical. For example, all components can be dry mixed and then extruded. If preferred, the reactants can be added sequentially wherein, for example, the grafting reaction occurs first, and additional stabilizer(s) is added downstream from the extruder.

Reinforcing

The grafted, or modified, stabilized stereoregular polymers of higher alpha-olefins optionally can be reinforced with a reinforcing agent, such as, for example, glass fibers. The glass fiber reinforcement improves the properties, such as, for example, the thermal properties, of the polymer. Any fiberous silicon oxide material can be used. Examples of types of glass include, but are not limited to, type A glass, an alkali glass; type E glass, a boroaluminosilicate; type C glass, a calcium aluminosilicate; and type S glass, a high-strength glass. Type E glass is presently preferred due to economic reasons and commercial availability. Preferably, the glass fibers are sized. The sizing agent can contain one or more components selected from the group consisting of coupling agnets, film formers, lubricants, and emulsifiers.

The glass fibers, preferably, have a high aspect ratio. The aspect ratio is the ratio of the fiber length to the fiber diameter. The diameter of the glass fibers is preferably less than about 20 micrometers ($\mu$m). Usually, the fiber diameter is in the range of about 3 to about 18 $\mu$m. Commercially available glass fibers usually have a diameter in the range of about 8 to about 15 $\mu$m. The initial length of the glass fibers, prior to extruding, is preferably greater than about 2 millimeters (mm). Usually, the fiber length is in the range of about 3 to about 50 mm. Commercially available glass fibers usually have a length in the range of about 4 to about 13 mm. A higher as[pect ratio provides a fiber with more surface area and, thus, greater improvement of polymer properties for a given mass of fibers.

If added to the polymer, the glass fibers are present in the range of about 10 to about 200 parts by weight of glass fiber per 100 parts by weight of polymer (phr). Preferably, the glass fibers are present in the range of about 10 to about 120 phr, and most preferably present in the range of about 10 to about 80 phr. Expressed in other terms, the glass fibers, if used, are present in about 10 to about 67 weight percent, based on the weight of the total product. Preferably, the glass fibers are present in the range of about 10 to about 55 weight percent, and most preferably in the range of about 10 to about 45 weight percent. Not enough glass fiber does not improve the polymer properties and too much glass fiber results in not enough polymer to coat the glass fiber, i.e., the fibers are not "wetted out".

Similar to the grafting process, the fibers can be added any time after the polymer has been initially stabilized with the hindered phenol prophylactic charge. Batch and/or continuous processes can be used, as long as all components are well dispersed and well blended. A continuous process is preferred for ease of operation. One example of a continuous process is to add the polymer, stabilizer(s), grafting compound(s), free radical generator(s), and glass fibers to an extruder. As with the grafting reaction, the components can be added in any order. For example, all components can be dry mixed and then extruded. If preferred, the reactants can be added sequentially wherein, for example, the grafting reaction occurs first, and additional stabilizer(s) and glass fibers are added downstream from the extruder. For ease of operation, all components are first dry mixed, then glass fibers are added, and finally the dry mixture is extruded.

EXAMPLES

The polymethylpentene (PMP) used in the following examples is prepared from 4-methyl-1-pentene (4MP1) by conventional polymerization processes, such as, for example, accoridng to U.S. 4,342,854. In some examples, 4MP1 was polymerized in the presence of a comonomer, 1-decene. The content of 1-decene in the polymer is given as mole percent 1-decene in the polymer. The undried polymer was stabilized immediately after polymerization by mixing the polymer solution with an acetone solution of the hindered phenol prophylactic charge stabilizer, as well as three other stabilizers. The acetone solution was prepared and mixed with the polymer solution so that 100 aprts of untreated polymer further contained 0.1 part of 2,6-di-tert-butyl-4-methylphenol (available from Uniroyal Chemical Co., as BHT), 0.2 parts of 1,3,5-tris(3,5-di-tert-butyl-40hydroxybenzyl) isocyanurate (available from Ciba-Geigy Corp., as Irganox 3114), 0.3 parts of bis(2,4-di-tert-butylphenyl)pentaerythritol diphosphite (available from Borg-Warner chemical co., as Ultranox 626), and 0.05 parts of calcium stearate (available from Nuodex, Inc.).

These combined solutions were dried in a Bepex torus disc drier at 100° C. for about 2 hours, to remove the liquids and produce a treated, stabilized polymer. The treated polymer was analyzed for an initial melt index according to ASTM method D1238, using a 5 kg weight and 260° C. temperature.

In each of the following runs, 100 parts of treated, stabilized polymer were placed in a high intensity Henschel mixer with the additional components, except glass fibers, in amounts, given in parts, as listed in the following examples and tables. The components were dry mixed for about 3 minutes at about 25° C. (room temperature), at a speed of 2500 rpm.

The resultant dry blend mixtuer was pelletized into 3 mm diameter by about 3 mm long pellets by feeding the mixture into a single screw Davis-Standard Model 150S extruder. If glass fibers were added, the glass fibers were added to the dry blend mixture in the hopper of the extruder. The extruder had a mixing zone temperature of 271° C., a heating heating zone temperature of 271° C., a melting zone temperature of 271° C.(520° F.), a screw speed of 90 rpm, and a pressure of 300 psi. The pellets were chopped into 3 mm lengths and dried in the presence of air for 12 hours at 120° C.

The pellets were injection molded in a 74 ton New Britain injection mold machine with a mold temperature of 150° F. (66° C.) and a barrel temperature of 560° F. (293° C.). An ASTM test specimen mold was used to form Type I tensile bars (⅛ inch thick) and flexural bars (5 inches long by ½ inch wide by ⅛ inch thick) which were used for testing.

The following test procedures were utilized.

| Analysis | ASTM Method No. |
|---|---|
| Tensile Strength at Break (PSI) | D638, at 5 mm/min. |
| Elongation at Break (%) | D638, at 5 mm/min |
| Flexural Strength (PSI) | D790, 2 inch span, 1 mm/min. crosshead speed |
| Flexural Modulus (PSI) | D790, 2 inch span, 1 mm/min crosshead speed |
| Izod Impact Strength, Notched and Unnoteched (Ft-lbs/Inch) | D256 |
| Heat Deflection Temperature Under Load (HDTUL) (°C.) | D648, at 66 psi and 264 psi |
| Insulation Resistance (ohms) | D257, at 90° C. humidity, for 48 hours |
| Hydrolytic Stability (%) | D638, percent retention of tensile strength at break after 250 hours at 250° F. under 15 psi steam |

The polymer compositions and test results are given in the following examples.

EXAMPLE 1

TABLE I

| Run | 101 | 102 | 103 | 104 | 105 | 106 | 107 |
|---|---|---|---|---|---|---|---|
| PMP[(1)] | 100 | 100 | 100 | 100 | 100 | 100 | 100 |
| Glass fiber[(2)] | 42.9 | 42.9 | 42.9 | 42.9 | 42.9 | 42.9 | 42.9 |
| Silane[(3)] | 0 | 0 | 0 | 0 | 0 | 0 | 0.43 |
| Peroxide[(4)] | 0 | 0.0125 | 0.05 | 0.0125 | 0.05 | 0.03125 | 0.1 |
| MAH[(5)] | 0 | 0.02 | 0.02 | 0.8 | 0.8 | 0.41 | 0 |
| Tensile Strength, psi | 6900 | 6500 | 6200 | 9300 | 9900 | 8800 | 9200 |
| Elongation, % | 2.0 | 1.7 | 1.6 | 3.0 | 3.1 | 2.5 | 2.9 |
| Flexural Strength, psi | 10,400 | 9,600 | 9,400 | 13,900 | 14,300 | 12,800 | 13,300 |
| Flexural Modulus (× 1000), psi | 829 | 841 | 810 | 863 | 827 | 866 | 819 |
| Izod, notched, ft-lb/in | 1.5 | 1.3 | 1.3 | 1.6 | 1.7 | 1.4 | 1.5 |
| Izod, unnotched, ft-lb/in | 2.8 | 2.9 | 2.4 | 4.5 | 5.4 | 3.7 | 4.2 |
| HDTUL, 264 psi, °C. | 157 | 144 | 150 | 187 | 194 | 186 | 194 |
| Melt Index, | 7.6 | 27.1 | 107.8 | 21.6 | 70.1 | 55.2 | 178.3 |

TABLE I-continued

| Run | 101 | 102 | 103 | 104 | 105 | 106 | 107 |
|---|---|---|---|---|---|---|---|
| g/10 min. | | | | | | | |

[1] PMP homopolymer, initial melt index of 9.0 g/10 min.
[2] Owens Corning Glass 457AA, sized for polypropylene, ~ 15 μm diameter
[3] Union Carbide A-174, 3-methacryloxypropyltrimethoxysilane
[4] Hercules VULCUP R, a,a'-bis(t-butylperoxy)diisopropylbenzene
[5] Maleic anhydride The data is Table I show that stereoregular polymers of branched, higher alpha-olefins can be grafted with carboxylic acid anhydrides and unsaturated silanes by a melt process. The properties of PMP grafted with a carboxylic acid anhydride and an unsaturated silane are given. Run 101 is a melt processed PMP with no additives other than the stabilizers and glass reinforcement. Runs 102-106 are grafted with maleic anhydride. The data show the effect of different levels of both maleic anhydride and peroxide. Run 107 is a PMP grafted with an unsaturated silane. It is clear that grafting either maleic anhydride or silane to PMP substantially improves the performance of glass reinforced compounds. In general, higher levels of maleic anhydride are required to obain equivalent performance to silane grafted PMP. Lower levels of peroxide can produce the same level of performance with less degradation due to visbreaking as evidenced by the melt indices. Too low a level of maleic anhydride does not result in improved performance at any level of peroxide. The maleic anhydride grafted PMP appears to have better properties than the silane grafted PMP. However, the difference in properties may be due to variations in the grafted PMP melt indices.

EXAMPLE 2

TABLE II

| Run | 201 | 202 | 203 |
|---|---|---|---|
| PMP[1] | 100 | 100 | 100 |
| Glass fiber[2] | 42.9 | 42.9 | 42.9 |
| Silane[3] | 0 | 0 | 1.0 |
| Peroxide[4] | 0 | 0.05 | 0.05 |
| MAH[5] | 0 | 0.8 | 0 |
| Tensile Strength, psi | 5700 | 8600 | 9300 |
| Elongation, % | 1.6 | 2.8 | 3.6 |
| Flexural Strength, psi | 8,800 | 12,500 | 13,400 |
| Flexural Modulus (× 1000), psi | 733 | 792 | 726 |
| Izod, notched, ft-lb/in | 1.3 | 1.5 | 2.0 |
| Izod, unnotched, ft-lb/in | 2.8 | 4.6 | 7.1 |
| HDTUL, 264 psi, °C. | 124 | 187 | 180 |
| Melt Index, g/10 min | 16.6 | 118.5 | 29.7 |
| Insulation, ohms | 4.4E12 | 1.4E9 | 6.1E12 |
| Hydrolytic Stability, % | 71.6 | 50.7 | 83.4 |

[1] PMP with 1.1 mole % 1-decene, initial melt index of 38 g/10 min
[2] Owens Corning Glass 457AA, sized for polypropylene, ~ 15 μm diameter
[3] Union Carbide A-174, 3-methacryloxypropyltrimethoxysilane
[4] Hercules VULCUP R, a,a'-bis(tert-butylperoxy)diisopropyl benzene
[5] Maleic anhydride The data in Table II show electrical properties and hydrolytic stability of stereoregular polymers of branched, higher alpha-olefins grafted with a carboxylic acid anhydride and an unsaturated silane. Both grafted PMP compounds exhibit significantly improved properties over the unmodified (ungrafted), glass reinforced PMP of Run 201. The properties of the grafted PMP are similar, except for insulation resistance and hydrolytic stability. The silane grafted, glass reinforced PMP in Run 203, appears to have better insulation resistance and hydroltyic stability than the maleic anhydride grafted, glass reinforced PMP in Run 202. Although these data may appear inconsistent with those of Example 1, possible explanations for the difference in properties are that the polymer in Example 2 is a copolymer with a higher initial melt index and/or the final compounds had slightly different formulations.

EXAMPLE 3

TABLE III

| Run | 301 | 302 | 303 | 304 | 305 |
|---|---|---|---|---|---|
| PMP[1] | 100 | 100 | 100 | 100 | 100 |
| Glass fiber[2] | 42.9 | 42.9 | 42.9 | 42.9 | 42.9 |
| Silane[3] | 0 | 0.43 | 0.43 | 0.43 | 0.43 |
| Peroxide[4] | 0.1 | 0.1 | 0.1 | 0.1 | 0.1 |
| Tensile Strength; psi | 6200 | 8500 | 8500 | 9300 | 6300 |
| Elongation, % | 1.8 | 2.6 | 2.6 | 2.9 | 1.8 |
| Flexural Strength, psi | 9,500 | 12,100 | 11,900 | 13,200 | 8,800 |
| Flexural Modulus (× 1,000), psi | 784 | 758 | 752 | 788 | 756 |
| Izod, notched, ft-lb/in | 1.1 | 1.3 | 1.3 | 1.4 | 1.2 |
| Izod, unnotched, ft-lb/in | 1.2 | 3.5 | 3.3 | 4.3 | 2.3 |
| HDTUL, 66 psi, °C. | 196 | 219 | 218 | 220 | 204 |
| HDTUL, 264 psi, °C. | 125 | 178 | 182 | 185 | 146 |

[1] PMP with 0.89 mole % 1-decene, initial melt index of 3.1 g/10 min.
[2] Owens Corning Glass 457AA, sized for polypropylene, about 15 μm diameter
[3] Run 102 = Union Carbide A-151, vinyltriethoxysilane; Run 103 = Union Carbide A-172, vinyltris(beta-methoxyethoxy) silane; Run 104 = Union Carbide A-174, 3-methacryloxypropyltrimethoxy-silane; Run 105 = Union Carbide A-1100, 3-aminopropyltriethoxysilane
[4] Hercules VULCUP R, a,a'-bis(tert-butylperoxy)diisopropyl benzene The data in Table III show the properties of glass reinforced, stereoregular polymers of branched, higher alpha-olefins grafted by a melt process with several silane compounds. All formulations include glass fibers and a peroxide. Run 301 contains no grafting compound. Runs 302-304 contain different vinyl-terminated silanes. Run 305 contains an amino-silane. Comparison of Run 301 with Runs 302-304 shows that the addition of a grafting compound is required to improve the properties of glass reinforced PMP. Run 305, where the amino-silane was the grafting compound, does not improve the properties as well as Runs 302-304, wherein viny.-terminated silanes were used.

TABLE IV

| Run | 401 | 402 | 403 | 404 | 405 | 406 | 407 | 408 | 409 |
|---|---|---|---|---|---|---|---|---|---|
| PMP[1] | 100 | 100 | 100 | 100 | 100 | 100 | 100 | 100 | 100 |
| Glass fiber[2] | 11.5 | 11.5 | 11.5 | 11.5 | 74.3 | 74.3 | 74.3 | 74.3 | 42.9 |
| Silane[3] | 0.5 | 2 | 0.5 | 2 | 0.5 | 2 | 0.5 | 2 | 1.25 |
| Peroxide[4] | 0.02 | 0.02 | 0.08 | 0.08 | 0.02 | 0.02 | 0.08 | 0.08 | 0.05 |
| Tensile Strength, psi | 5,800 | 5,200 | 6,200 | 6,000 | 9,100 | 8,700 | 10,200 | 10,400 | 9,600 |
| Elongation, % | 3.0 | 2.9 | 3.0 | 3.3 | 2.1 | 2.0 | 2.1 | 2.4 | 2.7 |
| Flexural | | | | | | | | | |

TABLE IV-continued

| Run | 401 | 402 | 403 | 404 | 405 | 406 | 407 | 408 | 409 |
|---|---|---|---|---|---|---|---|---|---|
| Strength, psi | 8,300 | 7,600 | 8,800 | 9,000 | 13,600 | 12,900 | 15,100 | 15,400 | 13,900 |
| Flexural Modulus (× 1000), psi | 362 | 337 | 365 | 371 | 1,137 | 1,171 | 1,213 | 1,222 | 859 |
| Izod, notched, ft-lb/in | 1.6 | 1.7 | 1.6 | 1.6 | 1.3 | 1.3 | 1.4 | 1.4 | 1.6 |
| Izod, unnotched, ft-lb/in | 3.0 | 3.0 | 3.0 | 3.3 | 3.4 | 2.9 | 3.3 | 4.1 | 4.2 |
| HDTUL, 264 psi, °C. | 92 | 90 | 109 | 134 | 179 | 174 | 195 | 191 | 187 |
| Melt Index, g/10 min | 17.9 | 13.8 | 103.1 | 47.6 | 7.2 | 5.7 | 60.5 | 17.8 | 19.5 |

[1]PMP homopolymer, initial melt index of 9.0 g/10 min
[2]Owens Corning Glass 457AA, sized for polypropylene, about 15 μm diameter
[3]Union Carbide A-174, 3-methacryloxypropyltrimethoxysilane
[4]Hercules VULCUP R, a,a'-bis(tert-butylperoxy)diisopropylbenzene Table IV shows that varying the amounts of vinyl-terminated silane, glass fiber, and peroxide effect the properties of stereoregular polymers of branched, higher alpha-olefins. The amounts of these different additives can be varied to produce PMP with specifically desired properties.

EXAMPLE 5

TABLE V

| Run | 501 | 502 |
|---|---|---|
| PMP[1] | 100 | 100 |
| Glass fiber[2] | 42.9 | 42.9 |
| Silane[3] | 0.43 | 0.43 |
| Peroxide[4] | 0.1 | 0.1 |
| Tensile Strength, psi | 8500 | 8400 |
| Elongation, % | 2.6 | 2.5 |
| Flexural Strength, psi | 11,900 | 11,200 |
| Flexural Modulus (× 1000), psi | 752 | 756 |
| Izod, notched, ft-lb/in | 1.3 | 1.4 |
| Izod, unnotched, ft-lb/in | 3.3 | 3.9 |
| HDTUL, 264 psi, °C. | 182 | 190 |

[1]PMP with 0.89 mole % 1-decene, initial melt index of 3.1 g/10 min
[2]Run 501 = Owens Corning Glass 457AA, sized for polypropylene, about 15 μm diameter
Run 502 = Owens Corning Glass 492AA, sized for polyester, about 10 μm diameter
[3]Union Carbide A-172, vinyltris(beta-methoxyethoxy)silane
[4]Hercules VULCUP R, a,a'-bis(tert-butylperoxy)diisopropylbenzene Table V gives data where different types of glass fibers are used to reinforce stereoregular polymers of branched, higher alpha-olefins. Both types of glass used in this Example, appear to produce a silane-grafted, glass reinforced PMP with similar properties.

While this invention has been described in detail for the purpose of illustration, it is not to be construed as limited thereby but is intended to cover all changes and modifications within the spirit and scope thereof.

That which is claimed is:

1. A process comprising:
   (a) contacting a stereoregular polymer of branched, higher alpha-olefins which have been stabilized with at least one hindered phenol, wherein said hindered phenol is present in the range of about 0.05 to about 2 parts by weight of hindered phenol per 100 parts by weight polymer;
   (b) with a grafting compound selected from the group consisting of vinyl-polymerizable, unsaturated, hydrolyzable silanes; carboxylic acids; carboxylic acid derivatives; carboxylic acid anhydrides; carboxylic acid anhydride derivatives; and mixtures thereof;
   (c) in the presence of a free radical generator;
   (d) in a melt at a temperature in the range of the melting temperature of hte polymer to about the decomposition temperature of the polymer.

2. A process according to claim 1 further comprising adding glass fiber reinforcement to the thus grafted polymer.

3. A process according to claim 1 wherein said polymer further comprises an alpha-olefin having from about 8 to about 16 carbon atoms.

4. A process according to claim 1 wherein said polymer has a melting pont of greater than about 190° C.

5. A process according to claim 1 wherein said branched, higher alpha-olefins are selected from the groupconsisting of 3-methyl-1-butene; 3-methyl-1-pentene; 4-methyl-1-pentene; 3-methyl-1-hexene; 3,3-dimethyl-1-butene; 4,4-dimethyl-1-hexene; and mixtures thereof.

6. A process according to claim 1 wherein sadi branched, higher alpha-olefin is 4-methyl-1-pentene.

7. A process according to claim 1 wherein said branched, higher alpha-olefin is 3-methyl-1-butene.

8. A process according to claim 1 wherein said hindered phenol is selected from the group consisting of 2,6-di-tert-butyl-4-methylphenol; tetrakis(methylene 3-(3,5-di-tert-butyl-4-hydroxyphenyl)-propionate)methane; octadecyl 3-(3,5-di-tert-butyl-4-hydroxyphenol)-propionate; and mixtures thereof.

9. A process according to claim 1 wherein said polymer has been further stabilized with a stabilizer selected from the group consisting of hindered phenols, organic phosphites, hindered amine light stabilizers, and mixtures thereof.

10. A process according to claim 9 wherein said stabilizers are present in the polymer in an amount of less than about 2 parts by weight stabilizer per 100 parts by weight polymer.

11. A process according to claim 1 wherein said grafting compound is present in an amount in the range of about 0.2 to about 2 parts by weight grafting compound per 100 parts by weight polymer.

12. A process according to claim 1 wherein said grafting compound is a vinyl-polymerizable, unsaturated, hydrolyzable silane selected from the group consisting of vinyltrichlorosilane, vinyltriethoxysilane, vinyltrimethoxysilane, vinyltris(beta-methoxyethoxy)silane, vinyltriacetoxysilane, gamma-methacryloxypropyltrimethoxysilane, 3-methacryloxypropyltris(beta-methoxyethoxy)silane, and mixtures thereof.

13. A process according to claim 1 wherein said grafting compound is a carboxylic acid anhydride and is selected from the group consisting of maleic anhydride, methyl norbornene-2,3-dicarboxylic anhydride, norbornene-2,3-dicarboxylic anhydride, and mixtures thereof.

14. A process according to claim 1 wherein said free radical generator is present in an amount in the range of about 0.001 to about 5 parts by weight of free radical generator per 100 parts by weight polymer.

15. A process according to claim 1 wherein said free radical generator is selected from the group consisting of di-tert-butyl peroxide; 2,5-dimethyl(2,5-di-tert-butylperoxy)hexyne-3; 2,5-dimethyl-2,5-di-tert-butylperoxyhexane; dicumyl peroxide; dibenzoyl peroxide; a,a'-bis(tert-butylperoxy)diisopropyl benzene; and mixtures thereof.

16. A process according to claim 1 wherein said melt is at a temperature in the range of about 20° C. above the melting point of the polymer to about the decomposition temperature of the polymer.

17. A process according to claim 2 wherein said glass fiber is present in an amount in the range of aobut 10 to about 200 parts by weight glass fiber per 100 parts by weight polymer.

18. A process according to claim 2 wherein said glass fiber has a diameter in the range of less than about 20 micrometers and a length greater than about 2 millimeters.

19. A process according to claim 1 wherein said stabilized polymer, grafting compound, and free radicl generator are dry blended prior to melting the polymer.

20. A process according to claim 1 wherein said stabilized polymer, grafting compound, and free radical generator are continuously blended in the polymer melt.

21. A process according to claim 2 wherein all components are dry blended prior to melting the polymer.

22. A process according to claim 2 wherein all components are continuously blended in the polymer melt.

23. A polymer composition prepared according to the process of claim 1.

24. A polymer composition prepared according to the process of claim 2.

25. A composition comprising:
   (a) a stereoregular polymer of branched, higher alpha-olefins;
   (b) at least one hindered phenol stabilizer, present in an amount in the range of about 0.05 to about 2 parts by weight hindered phenol per 100 parts by weight polymer;
   (c) a grafting compound selected from the group consisting of vinyl-polymerizable, unsaturated, hydrolyzable silanes; carboxylic acids; carboxylic acid derivatives; carboxylic acid anhydrides; carboxylic acid anhydride derivatives; and mixtures thereof; and
   (d) a free radical generator.

26. A composition according to claim 25 further comprising glass fibers.

27. A composition according to claim 25 further comprising organic phosphites, hindered amine light stabilizers, and mixtures thereof.

28. A composition according to claim 25 wherein said branched, higher alpha-olefin is 4-methyl-1-pentene.

29. A composition according to claim 25 wherein said branched, higher alpha-olefin is 3-methyl-1-butene.

30. A composition according to claim 25 wherein said grafting compound is present in an amount in the range of about 0.2 to about 2 parts by weight grafting compound per 100 parts by weight polymer and wherein said free radical generator is present in an amount in the range of about 0.005 to about 5 parts by weight free radical generator per 100 parts by weight polymer.

31. A composition according to claim 25 wherein said glass fiber is rpesent in an amount in the range of aobut 10 to about 200 parts by weight glass fiber per 100 parts by weight polymer.

32. An article of manufacture produced from the composition of claim 25.

33. An aticle of manufacture produced from the composition of claim 26.

34. A process comprising:
   (a) contacting a steroregular polymer of branched, higher alpha-olefins which have been stabilized with at least one hindered phenol, wherein said hindered phenol is present in the range of about 0.05 to about 2 parts by weight of hindered phenol per 100 parts by weight polymer;
   (b) with a grafting compound selected from the group consisting of vinyl-polymerizable, unsaturated, hydrolyxable silanes; carboxylic acids; carboxylic acid anhydrides; and mixtures thereof;
   (c) in the presence of a free radical generator;
   (d) in a melt at a temperature in the range of the melting temperature of the polymer to about the decomposition temperature of the polymer.

35. A process comprising:
   (a) contacting a steroregular polymer of branched, higher alpha-olefins which have been stabilized with at least one hindered phenol, wherein said hindered phenol is present in the range of about 0.05 to about 2 parts by weight polymer;
   (b) with a grafting compound which is a vinyl-polymerizable, unsaturated, hydrolyzable silane selected from the group consisting of vinyltrichlorosilane, vinyltriethoxysilane, vinyltrimethoxysilane, vinyltris(beta-methoxyethoxy)silane, vinyltriacetoxysilane, gamma-methacryloxypropyl-trimethoxysilane, 3-methoacryloxypropyltris(beta-methoxyethoxy)silane, and mixtures thereof.
   (c) in the presence of a free radical generator;
   (d) in a melt at a temperature in the range of the melting temperature of the polymer to about the decomposition temperature of the polymer.

* * * * *

UNITED STATES PATENT AND TRADEMARK OFFICE
CERTIFICATE OF CORRECTION

PATENT NO. : 4,888,394
DATED : December 19, 1989
INVENTOR(S) : Edwin Boudreaux, Jr.

It is certified that error appears in the above-identified patent and that said Letters Patent is hereby corrected as shown below:

Column 13, claim 1, line 67, delete "hte" and substitute --- the ---.

Column 14, claim 4, line 24, delete "pont" and substitute --- point ---.

Column 14, claim 5, line 27, delete "groupconsisting" and substitute --- group consisting ---.

Column 14, claim 6, line 31, delete "sadi" and substitute --- said ---.

Column 15, claim 17, line 16, delete "aobut" and substitute --- about ---.

Column 15, claim 19, line 25, delete "radicl" and substitute --- radical ---.

Column 15, claim 20, line 28, delete "compound,and" and substitute --- compound, and ---.

Column 16, claim 31, line 16, delete "rpesent" and "aobut" and substitute --- present --- and --- about ---.

Column 16, claim 34, line 32, delete "hydrolyxable" and substitute --- hydrolyzable ---.

UNITED STATES PATENT AND TRADEMARK OFFICE
CERTIFICATE OF CORRECTION

PATENT NO. : 4,888,394

DATED : December 19, 1989

INVENTOR(S) : Edwin Boudreaux, Jr.

It is certified that error appears in the above-identified patent and that said Letters Patent is hereby corrected as shown below:

Column 16, claim 35, line 50, delete "3-methoacryloxypropyltris(beta-methoxyethoxy)silane" and substitute --3-methacryloxypropyltris(beta-methoxyethoxy)silane---.

Signed and Sealed this

Twenty-ninth Day of January, 1991

Attest:

HARRY F. MANBECK, JR.

*Attesting Officer*   *Commissioner of Patents and Trademarks*